(12) United States Patent  
Ahn et al.

(10) Patent No.: US 8,243,430 B2
(45) Date of Patent: Aug. 14, 2012

(54) CRADLING DEVICE OF PORTABLE TYPE ELECTRONIC APPARATUS

(75) Inventors: Sung-Ho Ahn, Seoul (KR); Young-In Cho, Gyeonggi-do (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 358 days.

(21) Appl. No.: 12/608,409

(22) Filed: Oct. 29, 2009

(65) Prior Publication Data
US 2010/0124004 A1    May 20, 2010

(30) Foreign Application Priority Data

Nov. 20, 2008    (KR) .................. 10-2008-0115887

(51) Int. Cl.
*H05K 7/16* (2006.01)

(52) U.S. Cl. .............. 361/679.27; 361/679.01; 361/686; 455/575.1; 455/575.3; 455/575.4

(58) Field of Classification Search .................. 361/686, 361/679.01, 679.27; 455/575.1, 575.3, 575.4
See application file for complete search history.

(56) References Cited

U.S. PATENT DOCUMENTS

| | | | | |
|---|---|---|---|---|
| 5,548,478 A * | 8/1996 | Kumar et al. | ............ | 361/679.27 |
| 6,357,712 B1 * | 3/2002 | Lu | .............. | 248/291.1 |
| 6,398,587 B1 * | 6/2002 | Chen et al. | ............... | 439/607.35 |
| 7,065,835 B2 * | 6/2006 | Kuramochi | ...................... | 16/357 |
| 7,199,998 B2 * | 4/2007 | Miura | ............................ | 455/347 |
| 7,410,360 B2 * | 8/2008 | Pan | ................................. | 439/10 |
| 7,448,872 B2 * | 11/2008 | Im | ................................... | 439/10 |
| 7,564,967 B2 * | 7/2009 | Pan | ........................... | 379/433.12 |
| 7,583,496 B2 * | 9/2009 | Lai | ............................ | 361/679.3 |
| 7,611,113 B2 * | 11/2009 | Lai | ............................ | 248/286.1 |
| 7,650,671 B2 * | 1/2010 | Lee | ............................... | 16/362 |
| 8,032,192 B2 * | 10/2011 | Park | ........................... | 455/575.4 |
| 2006/0046796 A1 * | 3/2006 | Park et al. | ................... | 455/575.4 |
| 2006/0073859 A1 * | 4/2006 | Chou | ......................... | 455/575.4 |
| 2007/0072659 A1 * | 3/2007 | Ryu | .......................... | 455/575.3 |
| 2007/0091555 A1 * | 4/2007 | Lee | ................................. | 361/683 |
| 2007/0105606 A1 * | 5/2007 | Yoon et al. | .................. | 455/575.4 |
| 2007/0284496 A1 * | 12/2007 | Yokota | ......................... | 248/284.1 |
| 2008/0161075 A1 * | 7/2008 | Kim et al. | ................... | 455/575.4 |
| 2008/0230437 A1 * | 9/2008 | Ou et al. | ........................ | 206/701 |
| 2008/0304215 A1 * | 12/2008 | Chiu | ............................. | 361/681 |

FOREIGN PATENT DOCUMENTS

KR    10-678215    1/2007

* cited by examiner

*Primary Examiner* — Hung S Bui
*Assistant Examiner* — James Wu
(74) *Attorney, Agent, or Firm* — Cha & Reiter, LLC

(57) ABSTRACT

A cradling device of a portable electronic apparatus, which includes a first housing, and a second housing which is slid from the first housing and then is cradled with a slant on the first housing. The second housing can rotate relative to the first housing. The cradling device includes a first member provided in the first housing; a slidable second member capable of sliding, which is provided in the second housing and faces the first member; and at least one cradling module provided in the first housing and the first member, which rotates the first member together with the second member on a rotation axis and cradles the second housing after sliding movement of the slidable second member.

17 Claims, 9 Drawing Sheets

CRADLING DEVICE OF PORTABLE TYPE ELECTRONIC APPARATUS

CLAIM OF PRIORITY

This application claims priority to application entitled "Cradling Device Of Portable Type Electronic Apparatus" filed with the Korean Intellectual Property Office on Nov. 20, 2008 and assigned Serial No. 10-2008-0115887, the contents of which are incorporated herein by reference in its entirety.

BACKGROUND OF THE INVENTION

1. Field of the Invention

The present invention relates to a cradling device of a portable electronic apparatus, and more particularly to a cradling device for a portable electronic apparatus that can be rotatably cradled during sliding movement to allow a user to more easily and conveniently view the display in performing multimedia functions, such as internet searching, moving picture playback, or various kinds of games.

2. Description of the Related Art

Generally, a portable electronic apparatus comprises a device in which the user can access various contents, such as a portable terminal, an MP3 player, a PMP, a PDA, etc. Such a portable electronic apparatus has become multi-functional as manufacturers enhance customers' demands for more functionality as well as a compact size. In particular, a portable terminal generally refers to an electronic device with which the user can wirelessly communicate with another party. The types of portable terminal are divided into categories in view of their overall shape, including a bar-type, a flip-type, a folder-type, or a sliding-type portable terminal, which are all based on its opening/closing structure. In particular, the popular sliding-type mobile communication terminal has become widely used due to its convenient use and design superiority. Also, as communication technology rapidly develops, the presence of the portable terminal has become ubiquitous but yet more diversified than before. For example, through the portable terminal, it is not only possible to use a camera, but also to perform multimedia functions, such as Internet searching, moving picture playback, and various kinds of games. Accordingly, a large-sized display device is both a desire and necessity for many consumers. Also, cradling devices which can allow a user to more easily and conveniently view the display in performing multimedia functions, such as internet searching, moving picture playback, or various kinds of games, tend to be actively developed.

There has been particular interest in development of a sliding-type portable terminal including a main body housing and a sliding housing capable of sliding from the main body housing, some cradling devices which allow the sliding housing to be cradled on the main body housing, during the sliding of the sliding housing. Cradling devices with various structures, such as cam-type, a ball-type, etc. were disclosed.

First, a cradling device of the cam-type sliding-type portable terminal is mentioned in detail in Korean Patent Registration No. 0678215 entitled "Mobile Phone and Sliding-Cradling Apparatus Thereof" (dated Apr. 7, 2006) filed by the present assignee.

In the aforementioned Korean patent application, a sliding-type portable terminal includes a first housing and a second housing capable of sliding from the first housing. Also, the sliding-type portable terminal further includes a sliding cradling device for sliding and cradling the second housing on the first housing. The sliding cradling device includes: a first member and a second member, which enables sliding movement, and a hinge means, which enables the rotating and cradling of a slid second housing. The hinge means is a cap type, which includes a hinge cam, a hinge shaft, and an elastic body providing an elastic force at one side of the hinge shaft. Thus, when the second housing rotates on a rotation axis after its sliding movement, a concave portion of the hinge cam comes in contact with and is restrained by a convex portion of the hinge shaft to be cradled at a predetermined angle.

Also, FIG. 1 shows the conventional configuration of a ball type angle-adjusting hinge device for tilting a slidable second housing. As shown in FIG. 1, a ball type hinge device 8 includes: first and second plates 9 and 12, which are in contact with each other about a hinge axis A1; a ball 13 provided between the first and second plates 9 and 12; and an elastic body 14 providing an elastic force toward the second plate 12. The ball 13 is coupled on one surface of the first plate 9, forming a predetermined groove, and on the second plate 12, at least one groove 15 is formed to securely seat the ball 13 when the first plate 9 rotates. Accordingly, in this configuration, after the sliding movement of the second housing, the second housing rotates on the rotation axis A1, and then the ball 13 which has been securely seated in the groove 15 is securely seated in another groove formed along the rotation direction, so as to tilt the second housing at a predetermined angle.

However, in order to automatically tilt the second housing from the first housing, a cradling structure with a hinge cam type or a ball type includes an elastic body, a hinge cam, and a hinge shaft, or includes a number of parts, such as an elastic body, first and second plates, and ball. This conventional structure results in problems, such as an increase in production costs, and an increase in the number of assembly processes. In addition, in such an automatic tilting device as shown in FIG. 1, after the sliding movement of the second housing, the second housing automatically tilts and thereby impacts on the hinge device, which can cause a deformation or a crack in the terminal, and may cause malfunction of the hinge device. Also, the cradling structure causes a problem of increasing the thickness of the portable terminal because of the quantity of assembly parts to construct the device.

Accordingly, there is a long-felt need in the art for a cradling device of a portable electronic apparatus, in which after the sliding movement of a sliding housing, the sliding housing can be manually tilted from the main body housing. Also, there is a long-felt need in the art for a cradling device of a portable electronic apparatus, which can reduce the number of parts, thereby reducing the number of assembly processes and the production cost. Also, there is a long-felt need in the art for a cradling device of a portable electronic apparatus, in which the ratio of the occupied space within the portable electronic apparatus is reduced.

SUMMARY OF THE INVENTION

Accordingly, the present invention provides a cradling device of a portable electronic apparatus, in which after the sliding movement of a sliding housing, the sliding housing can be manually tilted from a main body housing at a predetermined adjusted angle. More particularly, the present invention provides a cradling device of a portable electronic apparatus, which can reduce the number of cradling parts, unlike a conventional cradling device requiring many cradling parts, and can reduce the number of assembly processes and the associated production costs. Also, the present invention provides a cradling device of a portable electronic apparatus, which can slim the size of the portable electronic apparatus by reducing the size of a cradling device for rotating and cradling a sliding housing.

In accordance with an exemplary aspect of the present invention, there is provided a cradling device of a portable electronic apparatus, which includes a first housing, and a second housing which is slid from the first housing and then is cradled with a slant on the first housing, the cradling device including: a first member provided in the first housing; a second member provided in the second housing and faces the first member; and at least one cradling module provided in the first housing and the first member, which rotates the first member together with the second member on a rotation axis and cradles the second housing after sliding movement of the second member.

BRIEF DESCRIPTION OF THE DRAWINGS

The above and other exemplary features, aspects, and advantages of the present invention will be more apparent from the following detailed description taken in conjunction with the accompanying drawings, in which.

DETAILED DESCRIPTION

Figure 1:
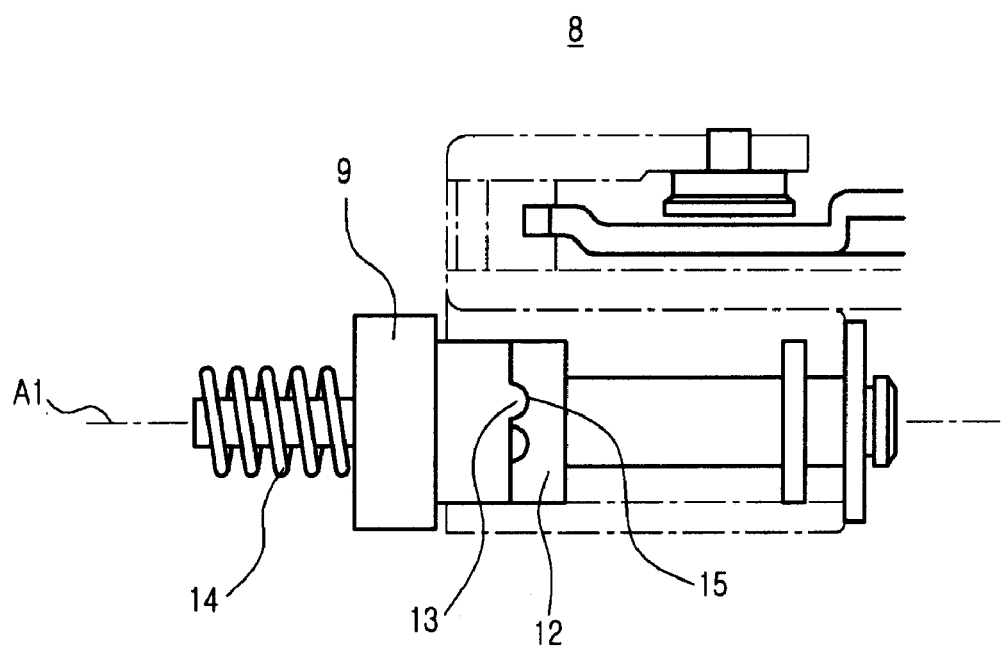
FIG. 1 is a perspective view illustrating a conventional ball-type cradling device in a cradling device of a portable electronic apparatus.

Hereinafter, a cradling device of a portable electronic apparatus, according to a preferred exemplary embodiments of the CRADLING DEVICE according to the present invention, will now be described in detail with reference to the accompanying drawings. In the following description of the present invention, a detailed description of known functions and configurations incorporated herein may be omitted when their inclusion might obscure appreciation by a person of ordinary skill in the art of the subject matter of the present invention. In addition, component parts corresponding to those in the conventional apparatus are typically denoted by the same reference numerals.

Figure 2:
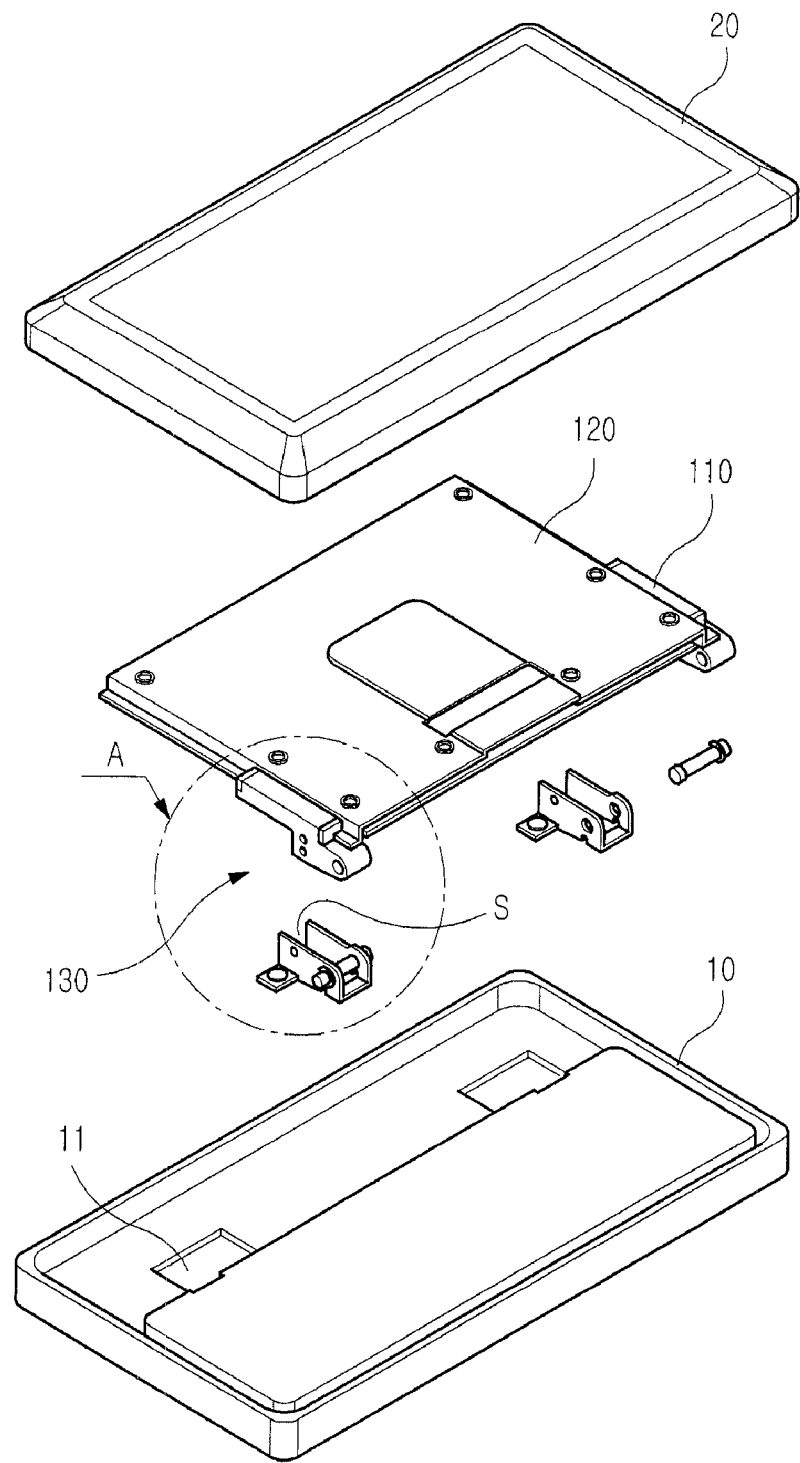
FIG. 2 is a perspective view illustrating a cradling device of a portable electronic apparatus, according to a preferred exemplary embodiment of the present invention.
Figure 10:
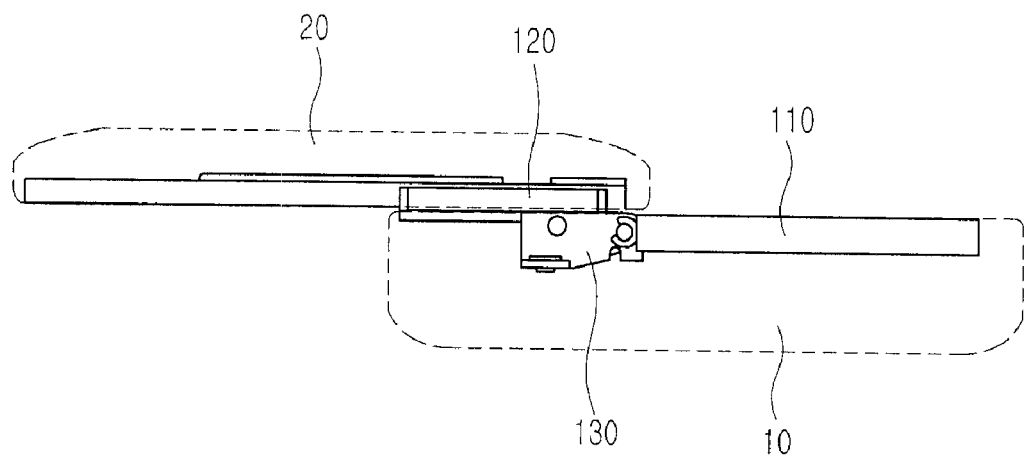
FIG. 10 illustrates a state of first and second members and a cradling module, when a second housing is slid from a first housing in a cradling device of a portable electronic apparatus, according to a preferred embodiment of the present invention.

As shown in FIGS. 2 and 10, a portable electronic apparatus includes: a first housing 10; and a second slidable housing 20 which is slid from the first housing 10, and then, after the sliding movement, is cradled on the first housing 10 with an inclination.

Figure 3:
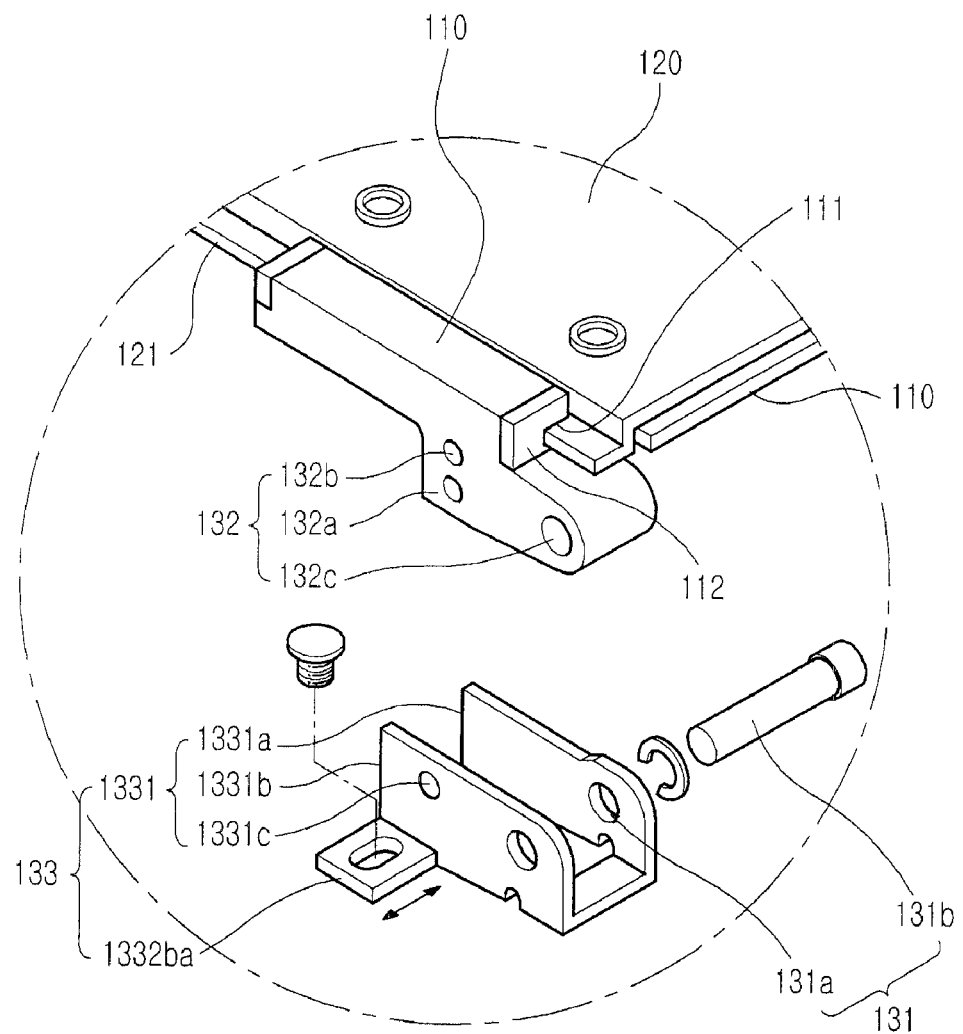
FIG. 3 is an enlarged view illustrating part A of FIG. 2.
Figure 11:
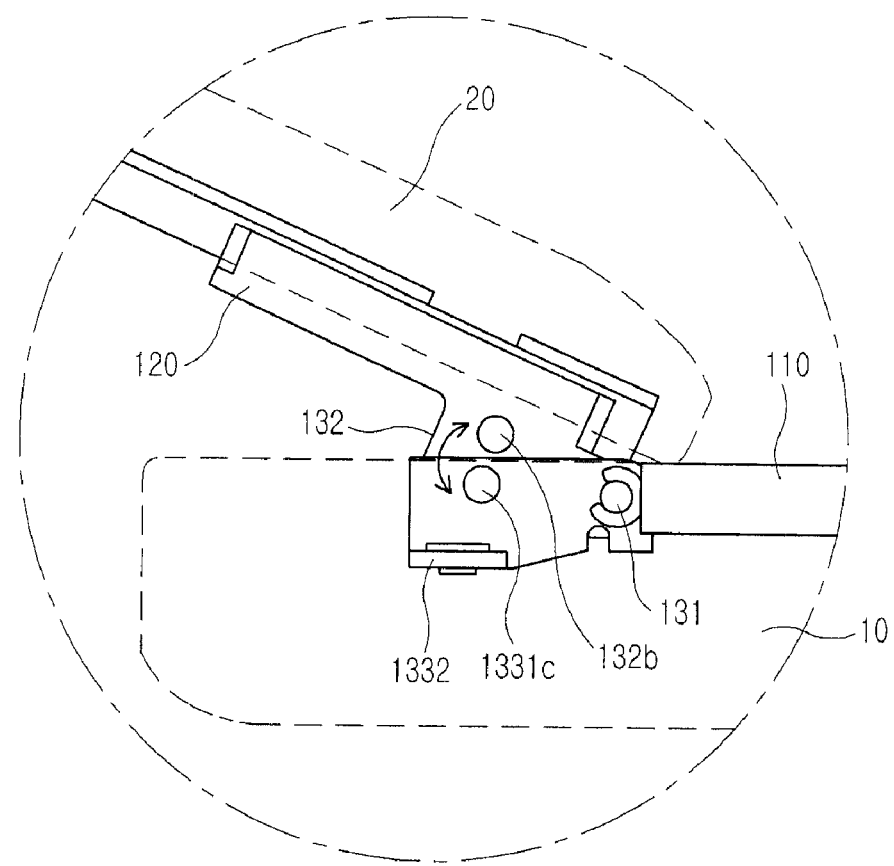
FIG. 11 is a partial view illustrating a state of first and second members and a cradling module, when a second housing is slid from a first housing and then is rotated and cradled, in a cradling device of a portable electronic apparatus, according to a preferred exemplary embodiment of the present invention.
Figure 12:
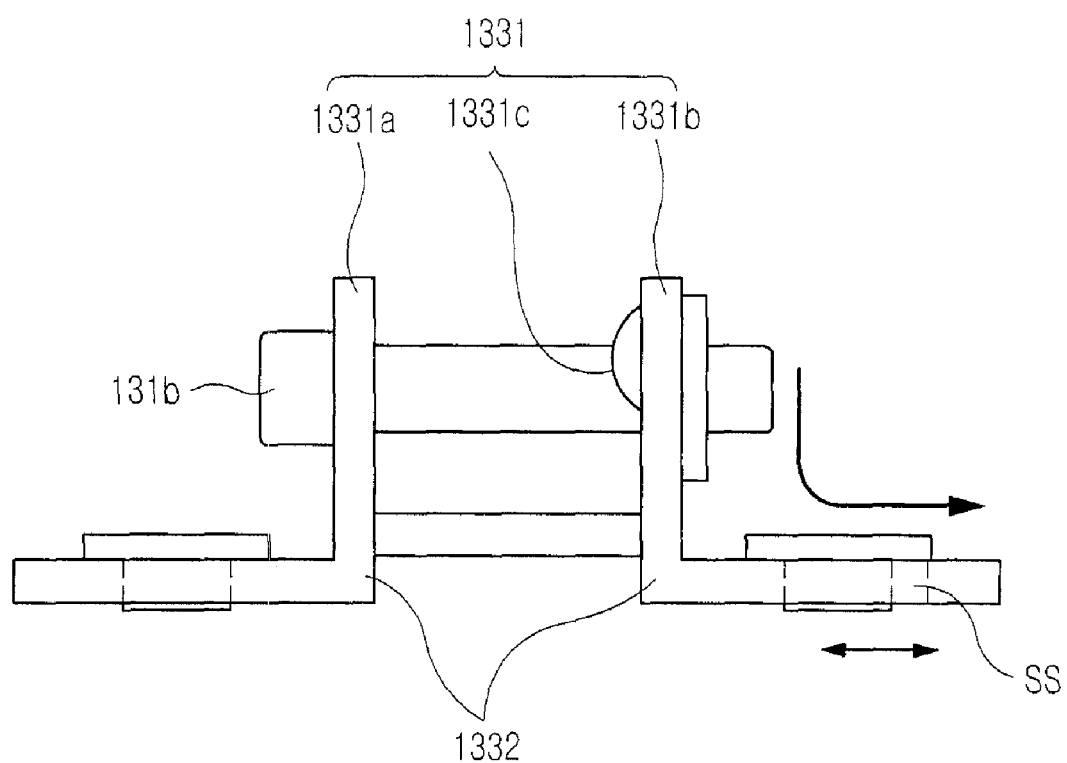
FIG. 12 illustrates the back side of a cradling module mounted in a first housing and a first member in a cradling device of a portable electronic apparatus, according to a preferred exemplary embodiment of the present invention.

As shown in FIGS. 2, 10, and 11, the cradling device of the portable electronic apparatus includes a first member 110, a slidable second member 120, and a cradling module 130. The first member 110 is provided in the first housing 10, and is coupled with the first housing 10 by the cradling module 130 that will be described later. As shown in FIG. 2, the first member 110 is preferably provided on the inward recessed portion of the first housing 10. The slidable second member 120 faces the first member 110 while being slidably arranged in the second housing 20. Also, although not shown, between the first member 110 and the second member 120, it is preferable to include an elastic member providing an elastic force which can allow the slidable second member 120 to be slid. The cradling module 130 is provided in the first housing 10 and is rotatably attached to the first member 110, so that after the sliding movement of the slidable second member 120, the first member 110 rotates on the rotation axis A while rotating the slidable second member 120 and the second housing 20 (that are provided at the top of the first member 110), thereby cradling the second housing 20 on the first housing 10. In the first housing 10, a mounting portion 11 for securely seating and mounting the cradling module 130 is preferably formed. As best shown in FIG. 3, at both sides of the first member 110, there are guide grooves 111 formed for securely seating and sliding both sides of the slidable second member 120, and at both sides of the slidable second member 120, guide rails 121 are formed and are securely seated in the guide grooves 111 and guided along the guide grooves 111. Preferably, in the guide grooves 111, a cushion portion 112 is further provided so as to facilitate the sliding movement of the guide rails 121 and to minimize the abrasion through the reduction of friction caused by the sliding movement.

As shown in FIGS. 2 to 7, and 10 to 12, the cradling module 130 includes a hinge unit 131, an angle adjusting unit 132, and an elastic supporter 133 (see FIGS. 3-6). The cradling module 130 is fixed in the first housing 10, while rotating the first member 110 and fixing the first member 110 at a predetermined angle. Then, this rotates the slidable second member 120 facing the top of the first member 110, thereby rotating the second housing 20. The hinge unit 131 has a rotation axis A for rotating the first member 110. Preferably, the hinge unit 131 has a 'U' shape, and a lower end of the 'U' shape faces the first housing 10. The angle adjusting unit 132 is rotatably coupled with the hinge unit 131, and is formed at the first member 110 so as to adjust the cradling angle of the second housing 20. The angle adjusting unit 132 is preferably integrally formed at both ends of the first member 110. The elastic supporter 133 extends from the hinge unit 131 and is mounted to the first housing 10, in such a manner that it can securely seat the angle adjusting unit 132 and provide an elastic force toward the angle adjusting unit 132 by engaging with the angle adjusting unit 132.

As shown in FIGS. 2 to 7, the angle adjusting unit 132 (see enlarged view in FIG. 3) includes a protrusion member 132a and an angle adjusting groove 132b. The protrusion member 132a is formed on one end of the first member 110, and protrudes toward the first housing 10, so that it can be securely seated in the elastic supporter 133. The protrusion member 132a protrudes from the lower end of the first member 110 in the direction of the sliding movement. The angle adjusting groove 132b is formed on one surface of the protrusion member 132a so as to engage with the elastic plate 1331b (FIG. 3, which will be described later) of the elastic supporter 133. Also, at least two angle adjusting grooves 132b are formed on one surface of the protrusion member 132a so as to securely seat the protruding protuberance 1331c (FIG. 3, which will be described later) of the elastic plate 1331b, and thereby to adjust an angle. For example, when angle adjusting grooves 132b are formed on one surface of the protrusion member 132a at intervals of 0°, 15°, and 30°, the protruding protuberance 1331c of the elastic plate 1331b is inserted at an angle of 0°, 15°, or 30°, thereby adjusting the rotation angle of the second housing 20 relative to the first housing.

As shown in FIGS. 2, 3, 4, and 7, at one end of the protrusion member 132a, a rotating hole 132c is formed, and the rotating hole 132c extends from one end of the protrusion member 132a and is coupled with the hinge unit 131 so that the first member 110 can rotate/pivot with respect to the first housing 10.

As shown in FIGS. 2, 3, 10, and 11, the hinge unit 131 includes a hinge hole 131a and a center pin 131b. The hinge hole 131a is engaged with the rotating hole 132c, and the center pin 131b is assembled by penetrating the hinge hole 131a and the rotating hole 132c such that it can form a rotation axis A during the rotation of the first member 110.

As shown in FIGS. 2 to 9, and 12, the elastic supporter 133 includes a couple of plates 1331 and a couple of fixing units 1332. The plates 1331 are opposed to each other so as to allow a secure-seating space S for securely seating the protrusion member 132a to be formed between the both side surfaces thereof, and extend from both side surfaces of the hinge unit 131. At least one plate 1331b of the plates 1331 provides an elastic force toward the protrusion member 132a. In other words, one surface of the protrusion member 132a is formed with the angle adjusting groove 132b faces the plate 1331b having an elastic force. The fixing units 1332 protrude from the outside surfaces of the plates 1331 so as to be fixed in the first housing 10. The fixing units 1332 are securely seated on the mounting portion 11 of the first housing 10, and then are fastened by a fastening member 140, such as a screw.

As shown in FIGS. 2 to 9, and 12, the plates 1331 are comprised of a supporting plate 1331a and an elastic plate 1331b. The supporting plate 1331a extends along one side surface of the rotating hole 132c so as to support the protrusion member 132a. The elastic plate 1331b has a plate shape capable of providing an elastic force toward the angle adjusting groove 132b, extends along the other side surface of the rotating hole 132c, is opposed to the supporting plate 1331a, and is in close (approximate) contact with one surface formed on the angle adjusting groove 132b. Accordingly, the supporting plate 1331a and the elastic plate 1331b are opposed to each other, and the protrusion member 132a is supported by one surface of the supporting plate 1331a and is subjected to an elastic force by the elastic plate 1331b.

Figure 4:
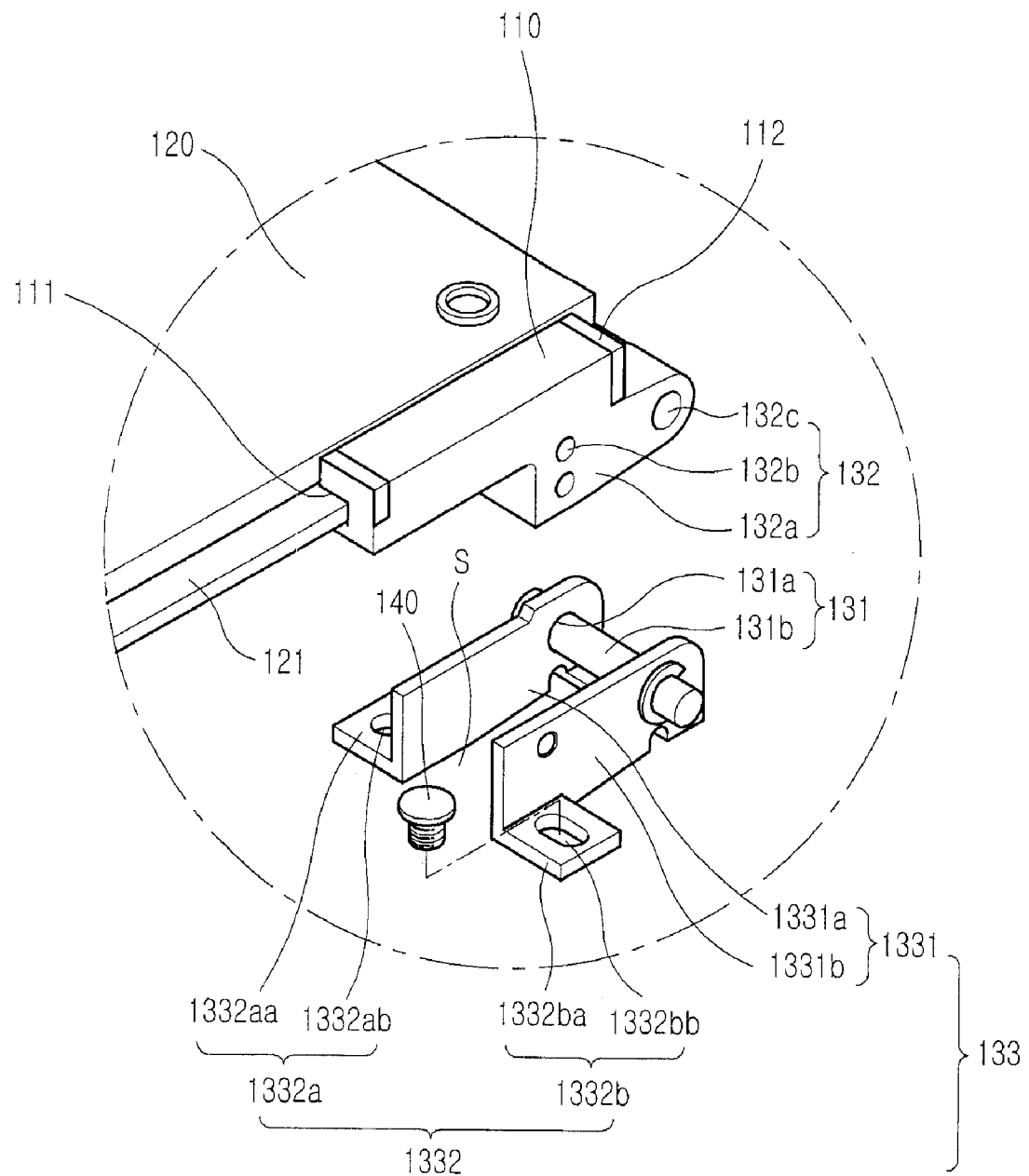
FIG. 4 is an enlarged perspective view in another direction of a cradling module in a cradling device of a portable electronic apparatus, according to a preferred exemplary embodiment of the present invention.
Figure 5:
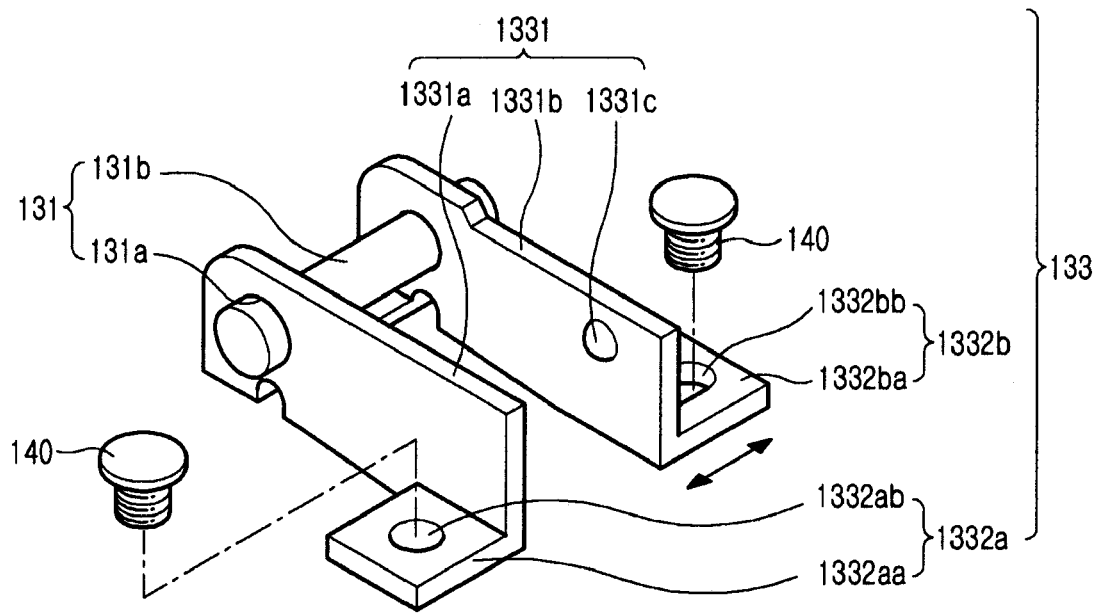
FIG. 5 is a perspective view illustrating an elastic supporter in a cradling device of a portable electronic apparatus, according to a preferred exemplary embodiment of the present invention.
Figure 6:
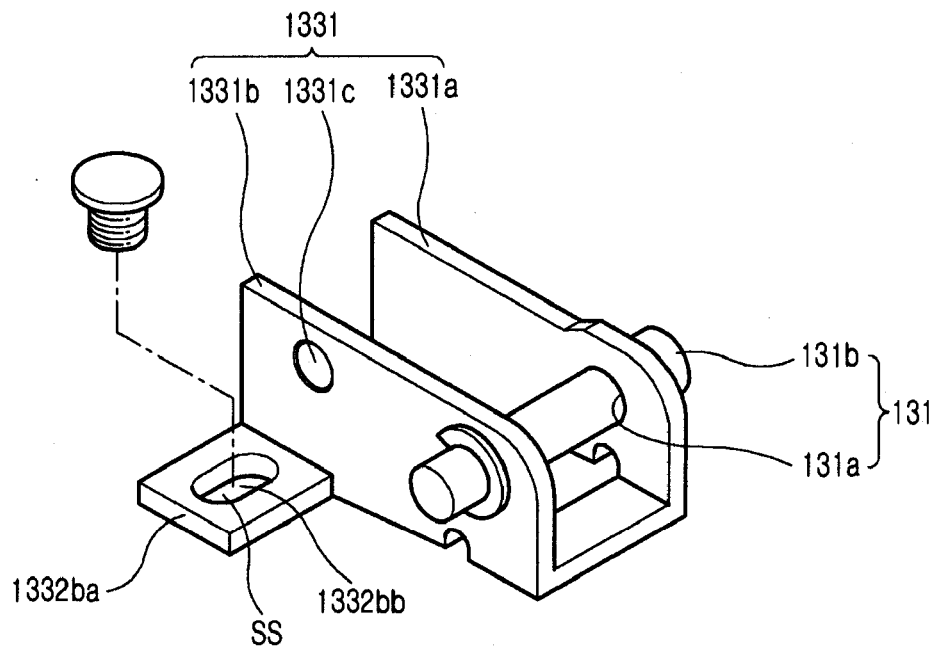
FIG. 6 is a perspective view in another direction of an elastic supporter in a cradling device of a portable electronic apparatus, according to a preferred exemplary embodiment of the present invention.
Figure 7:
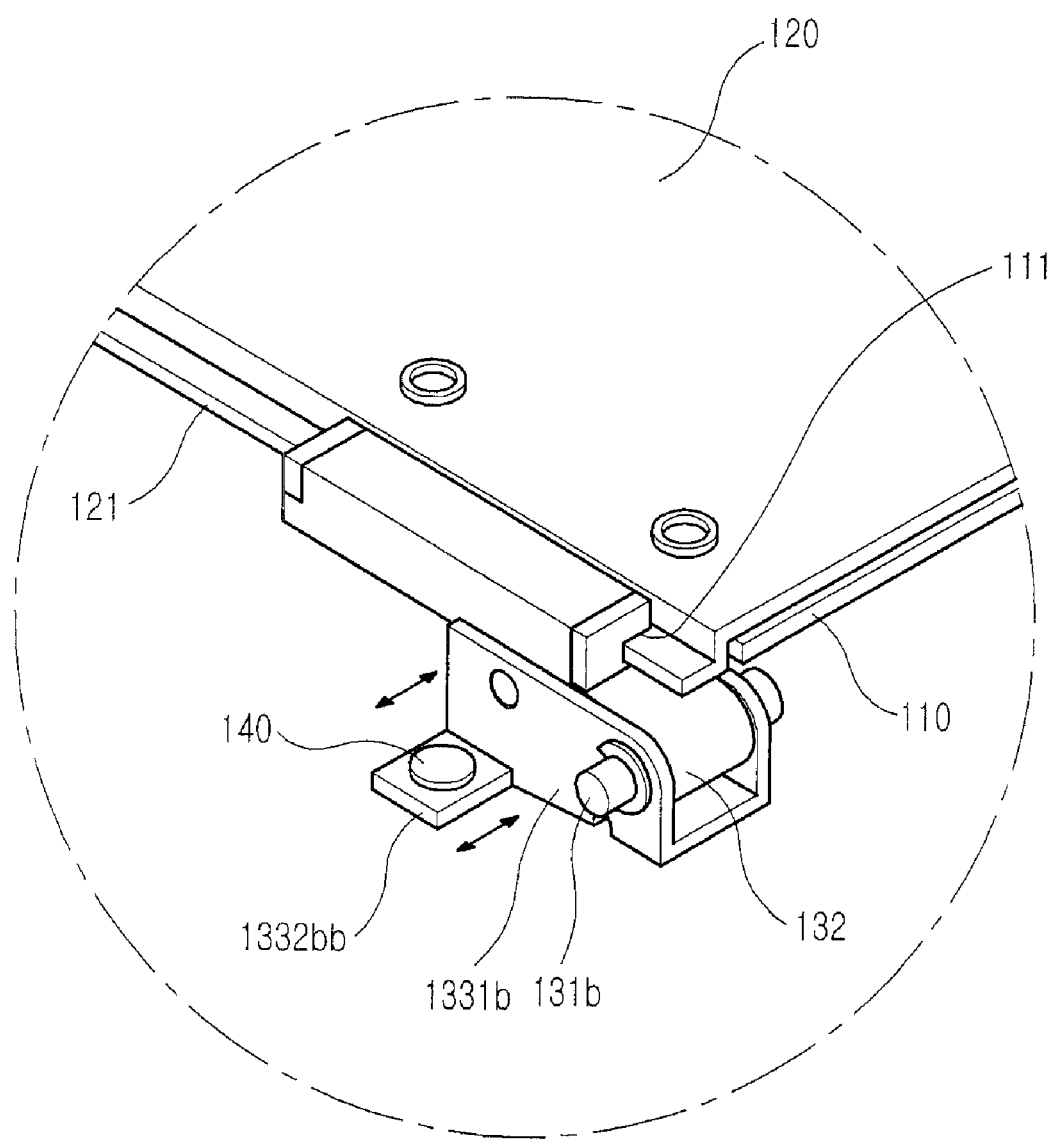
FIG. 7 is a perspective view illustrating a state where a hinge unit, an angle adjusting unit, and an elastic supporter are coupled in a cradling device of a portable electronic apparatus, according to a preferred exemplary embodiment of the present invention.
Figure 8:
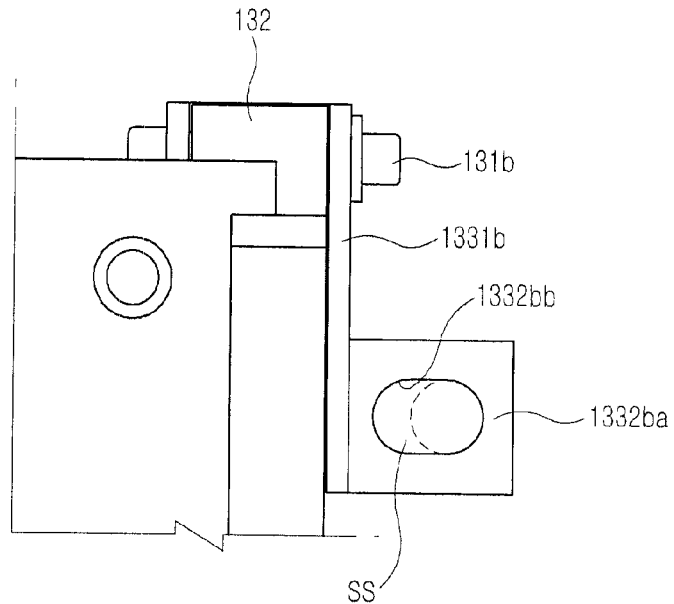
FIG. 8 is a partial plan view illustrating a state where a cradling module is mounted in a first member in a cradling device of a portable electronic apparatus, according to a preferred exemplary embodiment of the present invention.
Figure 9:
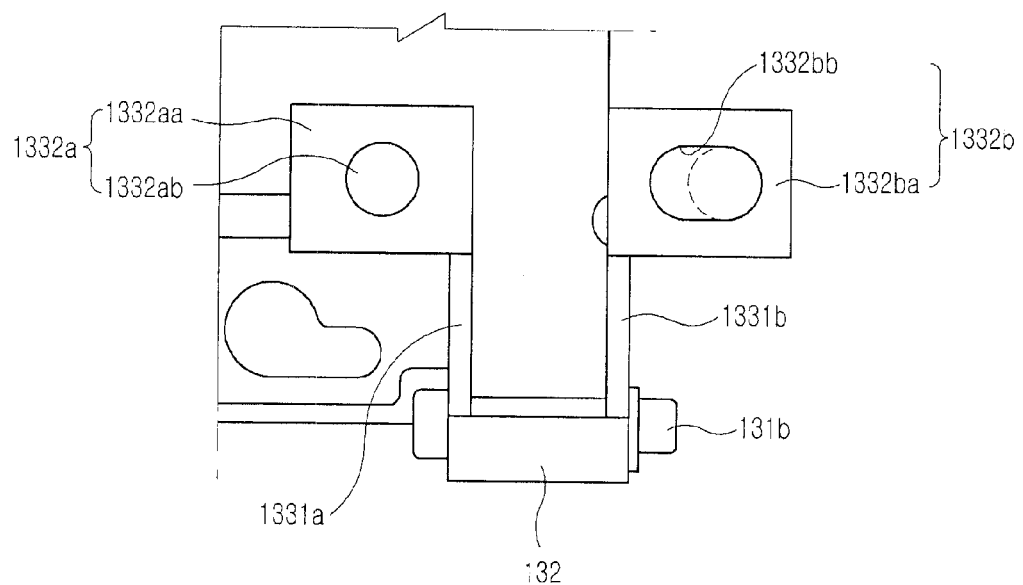
FIG. 9 is a partial plan view illustrating the lower side of a cradling module mounted in a first member in a cradling device of a portable electronic apparatus, according to a preferred exemplary embodiment of the present invention.

As shown in FIGS. 4, 5, and 6, on one surface of the elastic plate 1331b, the protruding protuberance 1331c that is engaged with the angle adjusting groove 132b protrudes. The protruding protuberance 1331c is securely seated in the angle adjusting groove 132b. Also, when the first member 110 rotates, the protruding protuberance 1331c moves to and is securely seated in another angle adjusting groove 132b which is spaced apart from the angle adjusting groove 132b by a predetermined interval, thereby fixing the first member 110 at a rotated angle.

Referring now to FIG. 5, the protruding protuberance 1331c has a hemisphere shape to be inserted in and drawn out of the angle adjusting groove 132b. As shown in FIGS. 2 to 12, the elastic plate 1331b includes a leaf spring.

As shown in FIGS. 2 to 9, and 12, the fixing unit 1332 includes a fixedly coupling portion 1332a, and a changeably coupling portion 1332b. The fixedly coupling portion 1332a is provided to the supporting plate 1331a in such a manner that it can be fixedly coupled with the first housing 10. The changeably coupling portion 1332b is provided to the elastic plate 1331b to be changeably coupled with the first housing 10, in such a manner that its position mounted in the first housing 10 can be changeable according to the elastic deformation of the elastic plate 1331b.

As shown in FIGS. 4, 5, 8, and 9, the fixedly coupling portion 1332a includes a fixing plate 1332aa, and a connecting hole 1332ab. The fixing plate 1332aa is provided at the supporting plate 1331a in such a manner that it can protrude from the outside of the supporting plate 1331a in a direction perpendicular to a sliding movement, the connecting hole 1332ab is formed in the fixing plate 1332aa, and in the connecting hole 1332ab, the fastening member 140 is mounted/fixed. The fixing plate 1332aa is securely seated on the mounting portion 11 formed at the first housing 10, and then is fixedly coupled with the first housing 10 through the fastening of the fastening member 140 (such as a screw but may be another type of fastener) into the connecting hole 1332ab.

As shown in FIGS. 3 and 4, and 6 to 10, the changeably coupling portion 1332b includes a changeable plate 1332ba, and a changeable hole 1332bb. The changeable plate 1332ba is provided at the elastic plate 1331b in such a manner that it can protrude from the outside of the elastic plate 1331b in a direction perpendicular to a sliding movement. The changeable hole 1332bb is formed in the changeable plate 1332ba, and in the changeable hole 1332bb, the fastening member 140 is mounted/fixed. The changeable plate 1332ba is securely seated on the mounting portion 11 formed at the first housing 10, and then is changeably coupled with the first housing 10 through the fastening of the fastening member 140 (such as a screw) into the changeable hole 1332bb.

As shown in FIGS. 3 and 4, and 6 to 10, the changeable hole 1332bb has an extra movement space SS (FIG. 6) according to a changeable direction by the elasticity of the elastic plate 1331b. Accordingly, when the protruding protuberance 1331c leaves the angle adjusting groove 132b, the interspace between the elastic plate 1331b and the supporting plate 1331a gets wider by a force on the elastic plate 1331b opposed to the supporting plate 1331a, correspondingly to the protruded portion of the protruding protuberance 1331c, and then the changeable plate 1332ba is pushed in a direction away from the supporting plate by the force caused by the elastic plate 1331b getting away from the supporting plate 1331a. Since the fastening member 140 fastened into the changeable hole 1332bb is fixedly coupled with the first housing 10, the extra movement space SS (FIG. 6) of the changeable hole 1332bb moves in a direction away from the supporting plate.

As shown in FIGS. 10 and 11, as the first member 110 rotates, the elastic plate 1331b provides an elastic force to one side of the protrusion member 132a, while the protruding protuberance 1331c of the elastic plate 1331b, which has been restrained in the angle adjusting groove 132b, leaves the angle adjusting groove 132b. The changeable plate 1332ba is moved from a first state where one side of the outer peripheral area of the fastening member 140 is in approximate contact with one side of the outer peripheral area of the changeable hole 1332bb, to a second state where the other side of the outer peripheral area of the fastening member 140 is in approximate contact with the other side of the outer peripheral area of the changeable hole 1332bb. Also, when the protruding protuberance 1331c is restrained in another angle adjusting groove 132b spaced apart from the other angle adjusting groove 132b by a predetermined interval, the changeable plate 1332ba is moved from the state where the other side of the outer peripheral area of the fastening member 140 is in approximate contact with the other side of the outer peripheral area of the changeable hole 1332bb to another state where one side of the outer peripheral area of the fastening member 140 is in approximate contact with one side of the outer peripheral area of the changeable hole 1332bb.

As shown in FIGS. 2, 10, and 11, in a state where the first housing 10 faces the second housing 20, when the second housing 20 is slid from the first housing 10, the guide rails 121 of the second member 120 are slid along the guide grooves 111 of the first member 110. In a state where the second housing 20 slid from the first housing 10, the supporting plate 1331a is in approximate contact with one side of the protrusion member 132a, the elastic plate 1331b is in approximate contact with the other side of the protrusion member 132a, the protruding protuberance 1331c of the elastic plate 1331b is securely seated in the angle adjusting groove 132b, and one side of the outer peripheral area of the fastening member 140 is in approximate contact with one side of the outer peripheral area of the changeable hole 1332bb. When the second housing 20 is rotated with respect to the first housing 10, the first member 110 rotates on the center pin 131b as rotation axis A with respect to the first housing 10, and the protruding protuberance 1331c of the elastic plate 1331b leaves the angle adjusting groove 132b. Herein, the changeable plate 1332ba is moved from a state where one side of the outer peripheral area of the fastening member 140 is in approximate contact with one side of the outer peripheral area of the changeable hole 1332bb, to another state where the other side of the outer peripheral area of the fastening member 140 is in approximate contact with the other side of the outer peripheral area of the changeable hole 1332bb. Then, the protruding protuberance 1331c is inserted into another angle adjusting groove 132b from the angle adjusting groove 132b. Herein, the changeable plate 1332ba is moved from the state where the other side of the outer peripheral area of the fastening member 140 is in approximate contact with the other side of the outer peripheral area of the changeable hole 1332bb to another state where one side of the outer peripheral area of the fastening member 140 is in approximate contact with one side of the outer peripheral area of the changeable hole 1332bb, while the second housing 20 is cradled on the first housing 10 at a predetermined angle.

Hereinafter, an exemplary operational process of a cradling device of a portable electronic apparatus according to a preferred exemplary embodiment of the present invention, with a configuration as described above, will be described in detail with reference to FIGS. 2 to 12.

In the portable electronic apparatus where the first housing 10, the first member 110, the second member 120, and the second housing 20 are sequentially layered, when a user slides the second housing 20 from the first housing 10, the guide rails 121 of the second member 120 are slid along the guide grooves 111 of the first member 110. First, in the layered configuration, the first member 110 is securely seated in the upper portion at the inside of the first housing 10. Then, the rotating hole 132c, which protrudes downward from one end of each of both sides of the first member 110 fixed in the first housing 10 and extendingly protrudes in the direction of the sliding movement, is engaged with the hinge hole 131a so that the rotating hole 132c and the hinge hole 131a penetrate each other, and the center pin 131b is mounted and fixed in the rotating hole 132c and the hinge hole 131a. The protrusion member 132a is engaged with the secure-seating space S formed between the supporting plate 1331a and the fixing plate 1332aa. Meanwhile, the protruding protuberance 1331c protruding from the elastic plate 1331b toward the supporting plate 1331a is securely seated in the angle adjusting groove 132b formed at the uppermost portion of the protrusion member 132a, and thus is not rotated by the elastic force of the elastic plate 1331b. Also, the upper portion of the guide rails 121 is securely seated in the guide grooves 111.

In the aforementioned state, when a user slides the second housing 20, the guide rails 121 are slid along the guide grooves 111, and the lower portion of the guide rails 121 is securely seated in the guide grooves 111, thereby stopping the sliding movement. The second housing 20 and the second member 120 are protruded from the upper portion of the first housing 10. Herein, when a user rotates the second housing 20 in a direction away from the first housing 10, the first member 110 facing the inside surface of the first housing 10 rotates on the center pin 131b as rotation axis A. Accordingly, the second housing 20 layered at the top of the first housing 110, and the second member 120, together with the first member 110, rotate in a direction away from the first housing 10.

Since the elastic supporter 133 is mounted at the inside of the first housing 10 by the fixing unit 1332, the protrusion member 132a rotates between the supporting plate 1331a and the elastic plate 1331b, on the rotating hole 132c rotatably fixed by the center pin 131b. The protruding protuberance 1331c of the elastic plate 1331b is drawn out of the angle adjusting groove 132b, and comes in contact with one surface of the protrusion member 132a. Accordingly, the elastic plate 1331b moves in a direction away from the supporting plate 1331a, while the changeable plate 1332ba moves in a direction away from the supporting plate 1331a with respect to the fastening member 140, to the extent corresponding to the extra movement space SS (FIG. 6) of the changeable hole 1332bb. In this state, the protruding protuberance 1331c faces another angle adjusting groove 132b spaced apart downward from the angle adjusting groove 132b by a predetermined interval, and then is engaged with and securely seated/fixed in the another angle adjusting groove 132b by the elastic force of the elastic plate 1331b. Also, the changeable plate 1332ba returns back to its initial position by moving in the extra movement space SS (FIG. 6) of the changeable hole 1332bb. The second housing 20, slid from the first housing 10, is rotated in a direction away from the first housing, and then is cradled at a predetermined angle.

Accordingly, through the simplified configuration of the protrusion member 132a securely seated the hinge unit 131, the elastic plate 1331b, and the supporting plate 1331a, it is possible to slide the second housing 20 from the first housing 10, and to cradle the slid second housing 20 at a predetermined angle. In other words, the first member 110, the second member 120, and the second housing 20 can be assembled at the upper portion of the first housing 10 by mounting the fixing unit 1332 of the elastic supporter 133 on the mounting portion 11 at the inside of the first housing 10, while securely seating the protrusion member 132a formed on the first member 110 in the elastic supporter 133. This simplified assembly process allows the sliding movement and cradling. Also, since the cradling module occupies a reduced space ratio within the portable electronic apparatus due to its simplified structure, the portable electronic apparatus can be slimmer.

As described above, a cradling device of a portable electronic apparatus, according to the present invention, includes a cradling module, which is fixed in the first housing and can rotate and cradle the first and second members, and thus can simply tilt a sliding housing from a main body housing. Also, in the cradling of the sliding housing, only a leaf spring-type elastic plate is used, thereby reducing the number of parts and the number of assembly processes. This can reduce the unit production cost.

In addition, an angle adjusting unit formed on the first member, and an elastic supporter mounted in the first housing can slide the second housing from the first housing, and rotate the second housing, thereby adjusting the rotation angle. In other words, the simplified structure allows the sliding movement and angle adjustment of the second housing. Also, in rotation, the protruding protuberance formed on one end of a leaf spring type elastic plate provides click touch at angle adjustment of the sliding housing.

While the invention has been shown and described with reference to certain exemplary embodiments thereof, it will be understood by those skilled in the art that various changes in form and details may be made therein without departing from the spirit of the invention as defined by the scope of the appended claims.

What is claimed is:

1. A cradling device of a portable electronic apparatus, which comprises a first housing, and a second housing arranged for being slid from the first housing and cradled with a slant on the first housing, the cradling device comprising:
   a first member provided in the first housing;
   a second member provided in the second housing to face the first member and be slidably disposed along the first member; and
   at least one cradling module provided in the first housing and rotatably attached to the first member for rotating the first member together with the second member on a rotation axis and cradling the second housing after sliding movement of the second member, wherein said at least one cradling module includes:
      a hinge unit forming a rotation axis A for rotating the first member;
      an angle adjusting unit, which is rotatably coupled with the hinge unit and is formed at the first member, so as to adjust a cradling angle of the second housing;
      an elastic supporter, which is mounted in the first housing, for securely seating the angle adjusting unit therein, and providing an elastic force toward the angle adjusting unit by engaging with and being elastically deformed by the angle adjusting unit, and
      a fixing unit coupled to the elastic supporter for mounting the elastic supporter in the first housing, the fixing unit including:
         a changeably coupling portion provided at a portion of the elastic supporter that is subject to elastic deformation by the angle adjusting unit, for changeably coupling with the first housing so that the changeably coupling portion's position mounted in the first housing is adjusted according to elastic deformation of the elastic supporter.

2. The cradling device of a portable electronic apparatus as claimed in claim 1, wherein the first member has guide grooves formed at both sides of the first member for securely seating and sliding both sides of the second member, and the second member has guide rails at both sides that are securely seated in the guide grooves and guided along the guide grooves of the first member.

3. The cradling device of a portable electronic apparatus as claimed in claim 1, wherein the elastic supporter extends from the hinge unit.

4. The cradling device of a portable electronic apparatus as claimed in claim 3, wherein the angle adjusting unit comprises: a protrusion member, which is formed on one end of the first member and protrudes toward the first housing, and is securely seated in the elastic supporter; and an angle adjusting groove formed on one surface of the protrusion member.

5. The cradling device of a portable electronic apparatus as claimed in claim 4, wherein the protrusion member includes a rotating hole therein extending from one end of the protrusion member and said protrusion member is coupled with the hinge unit so as to enable rotation of the first member with respect to the first housing.

6. The cradling device of a portable electronic apparatus as claimed in claim 5, wherein the hinge unit has a hinge hole therein engagingly aligned with the rotating hole, and wherein a center pin is arrange to penetrate the hinge hole and the rotating hole and form the rotation axis A during the rotation of the first member.

7. The cradling device of a portable electronic apparatus as claimed in claim 6, wherein the elastic supporter comprises: a pair of plates, which extend from both sides of the hinge unit, and are opposed to each other so as to allow a secure-seating space for securely seating the protrusion member to be formed between both side surfaces of the plates; and the fixing unit comprises a pair of fixing units, which protrude from outside surfaces of the plates and are fixed mounted in the first housing, wherein at least one plate comprises the portion of the elastic supporter that provides the elastic force, which elastic force is toward the protrusion member.

8. The cradling device of a portable electronic apparatus as claimed in claim 7, wherein the pair of plates comprise: a supporting plate that extends along one side surface of the rotating hole and supports the protrusion member; and a plate-shaped elastic plate that extends along the other side surface of the rotating hole, is opposed to the supporting plate of said pair of plates, and is in approximate contact with one surface formed on the angle adjusting groove, so as to provide the elastic force so it is directed toward the angle adjusting groove.

9. The cradling device of a portable electronic apparatus as claimed in claim 8, wherein on one surface of the elastic plate, a protruding protuberance being engaged with the angle adjusting groove protrudes.

10. The cradling device of a portable electronic apparatus as claimed in claim 9, wherein the protruding protuberance has a hemispherical shape for insertion into and removal of the angle adjusting groove.

11. The cradling device of a portable electronic apparatus as claimed in claim 10, wherein the elastic plate comprises a leaf spring.

12. The cradling device of a portable electronic apparatus as claimed in claim 8, wherein the fixing units comprise: a fixedly coupling portion, which is provided at the supporting plate and is fixedly coupled with the first housing; and the changeably coupling portion.

13. The cradling device of a portable electronic apparatus as claimed in claim 12, wherein the fixedly coupling portion includes a fixing plate, which is provided at the supporting plate and protrudes from outside of the supporting plate in a direction perpendicular to sliding movement; and the fixing plate having a connecting hole formed therein, wherein in the connecting hole, a fastening member is mounted and fixed.

14. The cradling device of a portable electronic apparatus as claimed in claim 13, wherein the changeably coupling portion includes a changeable plate, which is provided at the elastic plate, and protrudes from outside of the elastic plate in a direction perpendicular to sliding movement; and a changeable hole formed in the changeable plate, wherein in the changeable hole, a fastening member is mounted and fixed.

15. The cradling device of a portable electronic apparatus as claimed in claim 14, wherein the changeable hole has an oval shape for forming an extra movement space, according to a changeable direction, by elasticity of the elastic plate.

16. The cradling device of a portable electronic apparatus as claimed in claim 15, wherein when the elastic plate provides an elastic force to one side of the protrusion member by the rotation of the first member, and wherein when the protruding protuberance of the elastic plate restrained in the angle adjusting groove is pulled out, the changeable plate is moves from a state where one side of an outer peripheral area of the fastening member is in approximate contact with one side of an outer peripheral area of the changeable hole, to another state where the other side of the outer peripheral area of the fastening member is in approximate contact with the other side of the outer peripheral area of the changeable hole, and then when the protruding protuberance is restrained in another angle adjusting groove spaced apart from the angle adjusting groove by a predetermined interval, the changeable plate is moved from a state where the other side of the outer peripheral area of the fastening member is in approximate contact with the other side of the outer peripheral area of the changeable hole to another state where one side of the outer peripheral area of the fastening member is in approximate contact with one side of the outer peripheral area of the changeable hole.

17. The cradling device of a portable electronic apparatus as claimed in claim 15, wherein in a state where the first housing faces the second housing, as the second housing slides from the first housing, the guide rails of the slidable second member also slide along the guide grooves of the first member, wherein in a state where the second housing slides from the first housing, the supporting plate is in approximate contact with one side of the protrusion member, the elastic plate is in approximate contact with the other side of the protrusion member, and the protruding protuberance of the elastic plate is securely seated in the angle adjusting groove, and one side of the outer peripheral area of the fastening member is in approximate contact with one side of the outer peripheral area of the changeable hole, and when the second housing rotates with respect to the first housing, the first member rotates on the center pin as rotation axis A with respect to the first housing, and the protruding protuberance of the elastic plate is pulled out from the angle adjusting groove for moving the changeable plate from a first position where one side of the outer peripheral area of the fastening member is in approximate contact with one side of the outer peripheral area of the changeable hole to a second position where the other side of the outer peripheral area of the fastening member is in approximate contact with the other side of the outer peripheral area of the changeable hole, and so that when the protruding protuberance is inserted into another angle adjusting groove from the angle adjusting groove for moving the changeable plate from a location where the other side of the outer peripheral area of the fastening member is in approximate contact with to the other side of the outer peripheral area of the changeable hole to a location where one side of the outer peripheral area of the fastening member is in approximate contact with one side of the outer peripheral area of the changeable hole, and at the same time cradling the second housing on the first housing at a predetermined angle.

* * * * *

UNITED STATES PATENT AND TRADEMARK OFFICE
CERTIFICATE OF CORRECTION

PATENT NO. : 8,243,430 B2
APPLICATION NO. : 12/608409
DATED : August 14, 2012
INVENTOR(S) : Sung-Ho Ahn et al.

It is certified that error appears in the above-identified patent and that said Letters Patent is hereby corrected as shown below:

In the Claims

Column 10, Claim 7, Line 40 should read as follows:
--...and are mounted in...--

Column 11, Claim 16, Lines 27-28 should read as follows:
--...changeable plate is moved from a state...--

Column 12, Claim 17, Line 35 should read as follows:
--...contact to the other side...--

Signed and Sealed this
Fourth Day of June, 2013

Teresa Stanek Rea
*Acting Director of the United States Patent and Trademark Office*